United States Patent [19]

Calder

[11] Patent Number: 4,859,168

[45] Date of Patent: Aug. 22, 1989

[54] FOOD SCOOP MOLD WITH EJECTOR

[76] Inventor: Daniel N. Calder, 442 Willard Rd., Huntingdon Valley, Pa. 19006

[21] Appl. No.: 111,090

[22] Filed: Oct. 19, 1987

Related U.S. Application Data

[63] Continuation-in-part of Ser. No. 882,074, Jul. 3, 1986, abandoned.

[51] Int. Cl.⁴ .................................................. A47G 21/00
[52] U.S. Cl. .................................... 425/284; 425/286; D7/100
[58] Field of Search .............. 425/187, 276, 282, 284, 425/285, 286; 249/66 R, 74, 77; 426/389; 30/124, 128, 130, 324; D7/99, 100

[56] References Cited

U.S. PATENT DOCUMENTS

| | | | |
|---|---|---|---|
| 1,561,558 | 11/1925 | Manos | 425/286 |
| 1,642,726 | 9/1927 | Gardner | 425/286 |
| 1,688,595 | 10/1928 | Parr | 425/286 |
| 1,769,218 | 7/1930 | Garvis | 425/286 |
| 2,154,806 | 4/1939 | Clave et al. | 425/286 |
| 2,669,194 | 2/1954 | Brown | 425/286 |
| 3,046,912 | 7/1962 | Starck | 425/284 |

*Primary Examiner*—Jan H. Silbaugh
*Assistant Examiner*—Jill L. Heitbrink
*Attorney, Agent, or Firm*—Rohm & Monsanto

[57] ABSTRACT

A combination scoop and mold is provided with a mold cavity formed of said walls and a food displacement arrangement which ejects the molded food therefrom. Preferably, the food displacement member which causes ejection of the food also forms a back wall of the mold cavity and is coupled to a trigger which is actuatable by the user of the scoop arrangement. Preferably, the side walls are planar and parallel with each other, and may have any desired shape. Such a shape will determine the shape of the edible novelty which is formed by use of the scoop. In certain embodiments, the side walls may be replaceable so that a variety of novelty shapes may be used.

3 Claims, 2 Drawing Sheets

FOOD SCOOP MOLD WITH EJECTOR

This application is a continuation-in-part of application Ser. No. 882,074 filed July 3, 1986 now abandoned.

BACKGROUND OF THE INVENTION

This invention relates generally to scoops and molds for making edible novelties, and more particularly to an apparatus for scooping a moldable comestible, such as ice cream, directly into a mold, and ejecting the thus-molded comestible.

Although there are available devices for making ice cream novelties of the type where a formed quantity of ice cream is supported on a stick (see, for example, U.S. Pat. No. 3,383,730), there is not available a simple and economical system for making edible novelties of a type similar to an ice cream sandwich. A primary difficulty is in making a novelty formed of a relatively hard but moldable primary comestible, such as hard ice cream, which must be formed so as to be placeable on a secondary comestible, such as a brittle cookie. In making such an edible novelty, the forces which are applied to the hard ice cream to mold and pack it to form an ice cream sandwich are generally sufficient to shatter the cookie. Thus, there is a need for a system whereby an edible novelty, such as an ice cream sandwich formed of hard ice cream interposed between other comestibles, such as cookies, can be formed easily and inexpensively, and in a short period of time.

The need for such an arrangement is particularly acute in environments such as households and ice cream stores where several flavors of hard ice cream may be available, but one can not predetermine the particular flavor of ice cream which will be desired at any given time. In such an environment, if the ice cream sandwich is desired to be made using a soft or baked secondary comestible, the forces required to pack the ice cream, as the primary comestible, on the secondary comestible, which may be a cookie, will distort, shatter, or otherwise damage the cookie. Of course, if one uses a soft ice cream, such as custard, or partially hard ice cream, the need for high packing and forming forces is obviated. However, the novelty will then be difficult to consume since the ice cream will be extruded out from between the secondary comestibles when bitten. Accordingly, one known method for forming such sandwiches utilizes a soft or softened ice cream which, after the sandwich is formed, is refrozen. It is a problem with this approach, however, that refrigerated storage space must be maintained in addition to that required for the base inventory of ice cream, and the novelties will be available only in predetermined flavors and quantities.

U.S. Pat. No. 1,877,935 describes an ice cream dipper which is suitable for removing measured quantities of ice cream from a freezer and molding it into discs. The discs are intended to be served in paper boxes with wooden spoons. However, the disc which is formed by this known device is not suitable for certain ice cream novelties, such as ice cream sandwiches, where the dip is desired to have substantially flat sides where it joins other comestibles, such as baked members, or cookies. This results from the fact that the known device would require smoothing of the open disc face, such as by a doctor blade. This subsequent preparation of the disc face would render the known device to be difficult in use, particularly since the doctor blade would have to be used in the area of the supply of ice cream so that the skimmed excess can be returned thereto.

It is, therefore, an object of this invention to provide a simple and inexpensive apparatus for molding and dispensing ice cream.

It is also an object of this invention to provide an arrangement for making edible novelties formed of a hard, formable primary comestible in combination with a secondary comestible which may be soft, brittle, or shatterable.

It is another object of this invention to provide an arrangement for making edible novelties which is easily cleaned.

It is a further object of this invention to provide an arrangement for making an edible novelty wherein forces required in forming a primary comestible of the novelty to a predetermined shape are not applied to a secondary comestible.

It is additionally an object of this invention to provide an arrangement for forming an edible novelty formed of primary and secondary comestibles, the comestibles having predetermined dimensions and configurations.

It is yet another object of this invention to provide an apparatus for accumulating, molding, and dispensing a moldable comestible while requiring the use of only one hand.

It is a still further object of this invention to provide an arrangement for molding a moldable comestible to a shape having substantially planar opposed sides.

SUMMARY OF THE INVENTION

The foregoing and other objects are achieved in this invention which provides an apparatus for dispensing food, the apparatus having first and second side walls which define a predetermined space therebetween. In accordance with the the invention, the first and second side walls are coupled to one another in a spaced relationship so as to define a receptacle region which receives the food. A food displacement arrangement is provided within the receptacle region for urging the food in a direction which is essentially outward of the receptacle region, and substantially parallel along the first and second side walls.

In a preferred embodiment of the invention, the food displacement arrangement is formed with a manually actuatable portion and a food engagement portion. The manually actuatable portion is adapted to be accessible by a user of the invention, and preferably is arranged in the vicinity of a handle which is firmly coupled to the first and second side walls. The food engagement portion is arranged in the receptacle region and coupled to the manually actuatable portion whereby manipulation of the manually actuatable portion causes a responsive displacement of the food engagement portion, which is intended to be in communication with the food, so as to urge the food outward of the receptacle region.

In a specific illustrative embodiment of the invention, the food engagement portion is dimensioned to extend substantially for the entire distance between the first and second side walls. Such extension of the food engagement portion prevents extrusion of the food between the side walls and the food engagement portion. Preferably, therefore, the side walls are planar in the receptacle region and substantially parallel with one another.

In a simple embodiment of the invention, the food engagement portion and the manually actuatable portion are pivotally coupled to the handle or side walls.

Preferably, the pivotal coupling is effected at the point which is predeterminable by persons of skill in the art to achieve a desired mechanical advantage between the manipulation of the manually actuatable portion and the responsive displacement of the food engagement.

In some embodiments of the invention, the side walls are removable and replaceable with side walls having other configurations and dimensions so as to permit a variety of edible novelties to be formed therewith. In such embodiments, it is also advantageous if the food displacement arrangement is also replaceable. Such replaceability of side walls and food displacement arrangement will permit the apparatus to be customized easily so that various and preselected configurations for the edible novelties can be achieved.

BRIEF DESCRIPTION OF THE DRAWING

Comprehension of the invention is facilitated by reading the following detailed description in conjunction with the annexed drawing, in which.

DETAILED DESCRIPTION OF THE INVENTION

Figure 1:
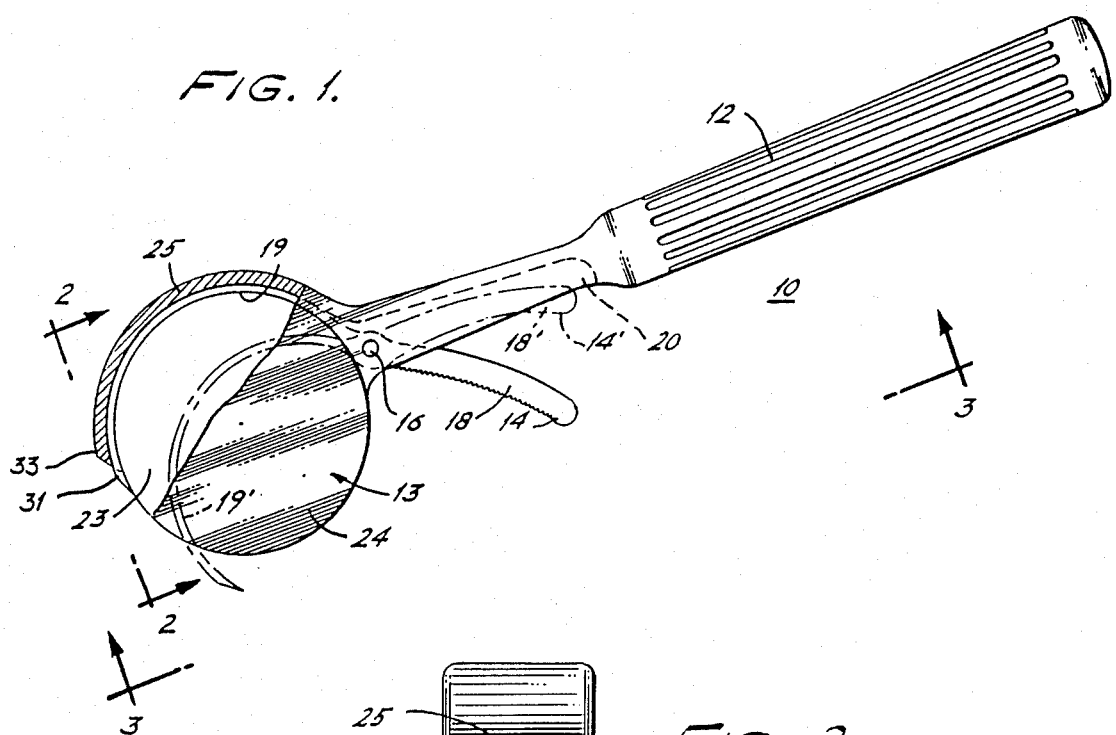
FIG. 1 is a partially phantomed plan view of a specific illustrative embodiment of a food scoop mold constructed in accordance with the invention.

FIG. 1 is a partially phantomed side view of a scoop arrangement 10 constructed in accordance with the invention. Scoop arrangement 10 is shown to have a handle portion 12, a receptacle region 13, and a food displacement arrangement 14. Food displacement arrangement 14 is coupled to the scoop arrangement at a pivot coupling 16, and is formed of a manually actuatable portion 18 and a food engagement portion 19.

Food displacement arrangement 14 is actuatable by a user thereof so as to assume a new position shown partially in phantom and designated as food displacement arrangement 14' After such displacement, manually actuatable portion 18' is partially accommodated, in this embodiment, in a recess 20, and food engagement portion 19' is displaced into receptacle region 13. In operation, the finger or thumb of a user of the scoop arrangement is applied to manually actuatable portion 18 so that it is urged pivotally to position 18' in recess 20. In response, food engagement portion 19 is displaced toward the open area of receptacle region 13, thereby urging any food contained within the receptacle region outward thereof.

Receptacle region 13 is formed of side walls 23 and 24 which are joined to one another, in this embodiment, by a back wall 25. The side walls are arranged preferably parallel to one another and have a predetermined configuration, illustratively substantially circular in this embodiment, which predetermines the general configuration of the edible novelty which will be produced by the scoop arrangement.

Figure 2:
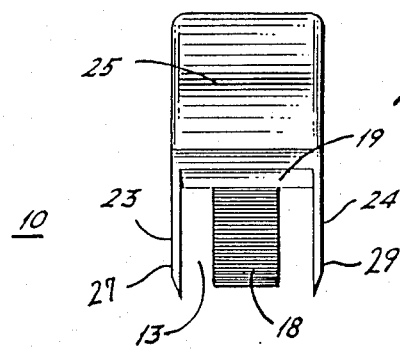
FIG. 2 is an end view of the embodiment of FIG. 1.

FIG. 2 is an end view of scoop arrangement 10. As shown, side walls 23 and 24 are joined to one another by back wall 25. Side walls 23 and 24 have curved front edges 27 and 29, respectively. In this specific illustrative embodiment, the side walls and the back wall are formed integrally with one another, such as by casting, and thereby a unitary and rigid scoop arrangment is produced. However, in other embodiments, the side walls may be joined to one another by other joining means such as fasteners, and the back wall may be provided with apertures therethrough or partialy eliminated. In such embodiments, food engagement portion 19 would serve as a back wall. Preferably, food engagement portion 19 should have a width sufficient to extend substantially the entire distance between the side walls.

Referring to FIG. 1, food engagement portion 19 is substantially C-like in configuration forming a substantially continuously curved back wall configured and dimensioned to extend for substantially the entire distance between the side walls 23 and 24. In this embodiment of the present invention, leading edge 31 of food engagement portion 19 extends slightly forward of distal end 33 of back wall 25. Therefore, the receptacle region 13 is at least partially defined by leading edge 31 and front edges 27 and 29.

While the scoop arrangement 10 has been described with the food engagement portion 19 having a leading edge 31 slightly forward of distal end 33, it is anticipated by the present invention that food engagement portion 19 can be shortened so that leading edge 31 is behind distal end 33. In this instance, the exposed portion of back wall 25, along with food engagement portion 19 and side walls 23 and 24, define the receptacle region 13.

In the scooping operation, scoop arrangement 10 engages the comestible within its non-activated position so that its curved back wall causes the comestible entering receptacle region 13 to travel in a substantially continuous swirling motion and thereby form into a cylindrical configuration.

FIGS. 1 and 2 show that front edges 27 and 29 of side walls 23 and 24, as well as back wall 25 and the leading edge 31 of food engagement portion 19 are all beveled to produce relatively sharp edges. Such edges will facilitate cutting into a relatively hard comestible, such as ice cream. Since the front edges 27 and 29 are curved, a user of scoop arrangement 10 initially contacts the comestible with only a portion, i.e., segments of the front edges 27 and 29. Thus, all of the user's force is applied to less than all of the cutting edges which results in a more concentrated cutting force. This is a very beneficial feature of the present invention; particularly in situations where the comestible is hard or frozen.

Figure 3:
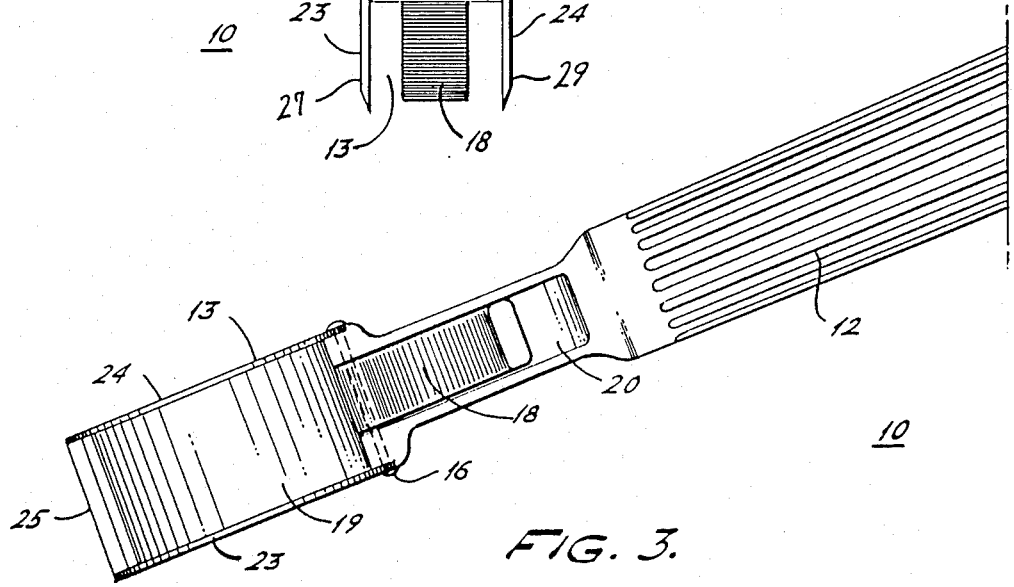
FIG. 3 is a side view of the embodiment of FIG. 1.

FIG. 3 is a side view of scoop arrangement 10 which looks into the opening of receptacle region 13. This figure clearly shows that food engagement portion 10 of the food displacement arrangement forms a rearmost wall of the receptacle region.

Figure 4:
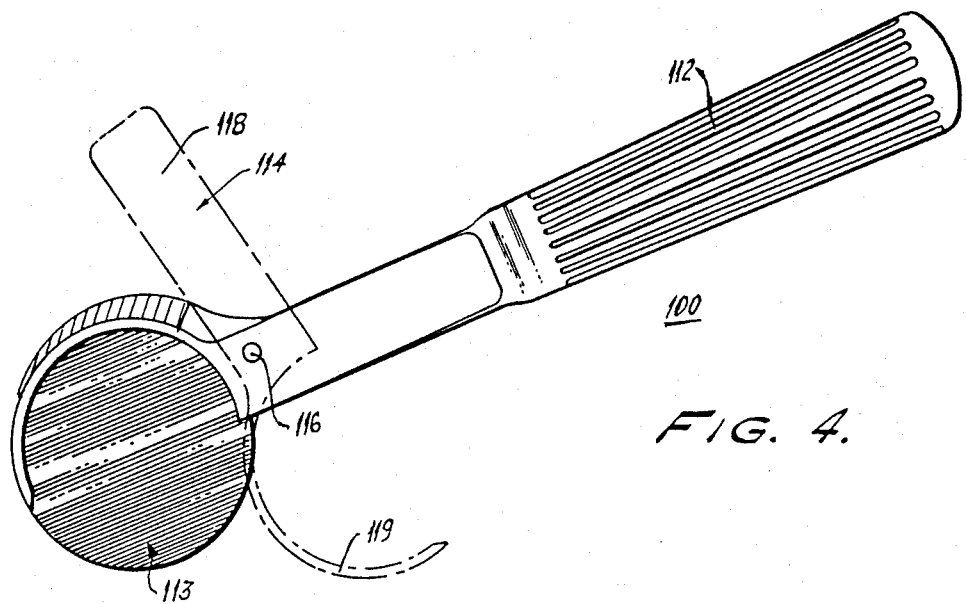
FIG. 4 is a partially phantomed plan view of a further embodiment of a food scoop constructed in accordance with the invention.

FIG. 4 is a partially phantomed side view of a further scoop arrangement 100 constructed in accordance with the invention. Scoop arrangement 100 is shown to have a handle portion 112, a receptacle region 113, and a food displacement arrangement 114. Food displacement arrangement 114 is coupled to he scoop arrangement at a pivot coupling 116, and is formed of a manually actuatable portion 118 and a food engagement portion 119.

Figure 5:
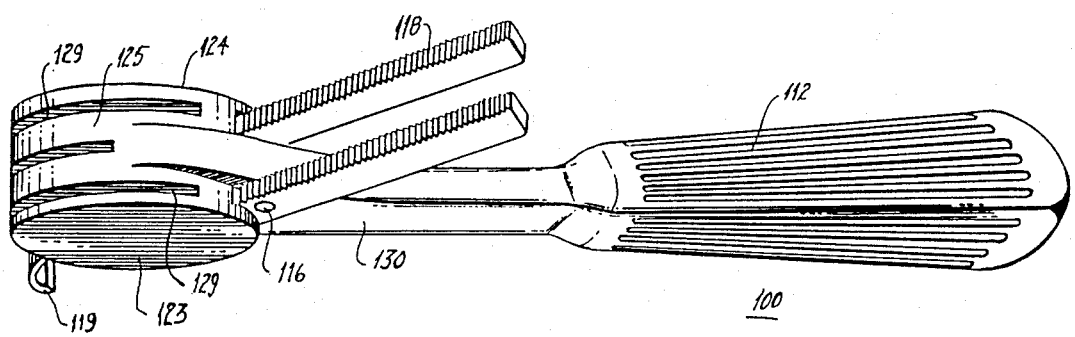
FIG. 5 is a back view of the food scoop of FIG. 4 showing the ejector in the ejection position.

FIG. 5 is a back view of the food scoop embodiment of FIG. 4 and shows a somewhat circular back wall 125 having a plurality of openings 129. Openings 129 serve to permit easy cleaning of the device while also preventing the accumulation of water or food between the back of food engagement portion 119 and the interior surface of back wall 125. Thus, in this embodiment, food engagement portion 119 serves as a wall which cooperates with a pair of side walls 122 and 124.

Figure 6:
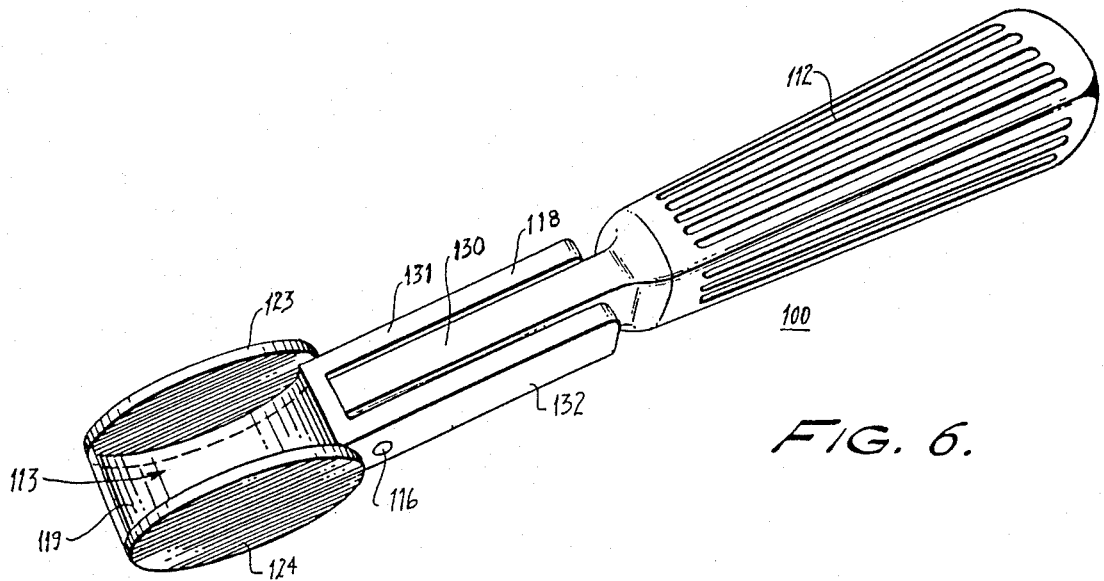
FIG. 6 is a front view of the food scoop of FIG. 4 showing the ejector in a retracted position.

FIG. 6 is a front view of the food scoop of FIGS. 4 and 5, and further shows the interior of a food receptacle region 113. It is best seen from this figure that food engagement portion 119 cooperates with side walls 123 and 124 to form the food receptacle region, which functions as a partial mold. In addition, FIGS. 5 and 6 illustrate that this specific embodiment of the invention provides a manually actuatable portion 118 which has two levers, 131 and 132, arranged on either side of a coupling portion 130 which couples the handles to the receptacle region. Thus, this embodiment, as well as the embodiment described with respect to FIGS. 1–3, can be used right-handedly and left-handedly.

Although the invention has been described in terms of specific embodiments and applications, persons skilled in the art can, in light of this teaching, generate additional embodiments without exceeding the scope or departing from the spirit of the claimed invention. For example, the side walls need not have a circular configuration, but may have any other shape, including polygonal shapes. Moreover, such walls need not be formed integrally with a back wall, and in fact, the function of the back wall may be replaced by the food engagement portion of the food displacement arrangement. Accordingly, it is to be understood that the drawing and descriptions in this disclosure are proffered to facilitate comprehension of the invention and should not be construed to limit the scope thereof.

What is claimed is:

1. An apparatus for dispensing food, the apparatus comprising:
    first and second planar side walls having a substantially circular configuration for defining a predetermined space therebetween;
    coupling means arranged in said predetermined space and substantially transverse with respect to said first and second side walls for coupling said first and second side walls to each other in substantially parallel spaced relationship and defining a substantially cylindrical receptacle region therebetween for receiving the food;
    a handle means extending from said coupling means; and food displacement means having:
        a food engagement portion arranged in said receptacle region forming a substantially continuously curved back wall dimensioned to extend for substantially the entire distance between said first and second side walls for closing a portion of said receptacle region, whereby the food entering into said receptacle region is formed into a cylindrical shape, and
        an actuation portion formed substantially integral with said food engagement portion and having two actuation arms substantially parallel to each other and disposed on opposite sides of said handle means, said two actuation arms being parallel with said handle means when said food engagement portion is positioned to close a portion of said substantially cylindrical receptacle region, said food engagement portion being pivotally movable in a direction parallel with said first and second side walls in response to manual actuation of either actuation arm, whereby the food is displaced along an arcuate path which is parallel with, and substantially along, said first and second side walls.

2. An apparatus for dispensing food comprising:
    first and second thin, substantially circular, disk-like side walls in substantially parallel, spaced apart overlying relationship;
    coupling means substantially transverse to said side walls for coupling said side walls along partial back peripheries thereof;
    a handle means extending from said coupling means;
    food displacement means disposed forwardly of said coupling means and forming a substantially continuously curved back wall configured and dimensioned to extend for substantially the entire distance between said side walls, said side walls and said back wall defining a substantially cylindrical receptacle region for receiving food and an opening thereto at least partially defined by the front edges of said side walls, said food displacement means being movable between non-actuated position, wherein said back wall defines said substantially cylindrical receptacle region, and an actuated position, wherein said food displacement means is disposed substantially out of and forwardly of said receptacle region; and
    means for pivotally moving said food displacement means from said non-actuated position to said actuated position to eject the formed food from said receptacle region forwardly through said opening, said moving means including two actuation arms substantially parallel to each other and disposed on opposite sides of said handle; said two actuation arms being integral with said food displacement means; and said two actuation arms being parallel with said handle means when said food displacement means is in said non-actuated position.

3. The apparatus of claim 2 wherein said two actuation arms are arranged to pivot with respect to said first and second side walls.

* * * * *